(12) United States Patent
Hitzfelder et al.

(10) Patent No.: US 11,485,315 B2
(45) Date of Patent: Nov. 1, 2022

(54) DEVICE FOR ARRANGING A PASSENGER RESTRAINT SYSTEM IN A VEHICLE

(71) Applicant: Aguti Produktentwicklung & Design GmbH, Langenargen (DE)

(72) Inventors: Klaus Hitzfelder, Heimenkirch (DE); Christian Rogg, Wasserburg (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 529 days.

(21) Appl. No.: 16/574,473

(22) Filed: Sep. 18, 2019

(65) Prior Publication Data

US 2021/0078525 A1   Mar. 18, 2021

(51) Int. Cl.
*B60R 22/18* (2006.01)
*B60N 2/005* (2006.01)
*B60N 2/26* (2006.01)
*B60N 2/24* (2006.01)

(52) U.S. Cl.
CPC .............. *B60R 22/18* (2013.01); *B60N 2/005* (2013.01); *B60N 2/242* (2013.01); *B60N 2/26* (2013.01)

(58) Field of Classification Search
CPC .......... B60R 22/18; B60N 2/005; B60N 2/26; B60N 2/242
See application file for complete search history.

(56) References Cited

U.S. PATENT DOCUMENTS

| | | | |
|---|---|---|---|
| 4,512,048 A | 4/1985 | Isham et al. | |
| 4,543,675 A | 10/1985 | Shrock | |
| 4,625,346 A | 12/1986 | Quackenbush | |
| 2002/0109381 A1 | 8/2002 | Duncan | |
| 2004/0080194 A1 | 4/2004 | Medvecky et al. | |
| 2016/0362026 A1 | 12/2016 | Mizobata et al. | |

FOREIGN PATENT DOCUMENTS

| | | |
|---|---|---|
| DE | 44 42 813 A1 | 6/1995 |
| DE | 297 04 735 U1 | 4/1997 |
| DE | 298 14 554 U1 | 11/1998 |
| DE | 10 2006 007 3 84 A1 | 7/2007 |
| DE | 10 2014 003 966 A1 | 9/2015 |
| FR | 3 004 151 A1 | 10/2014 |
| WO | 2016/046056 A1 | 3/2016 |

OTHER PUBLICATIONS

European Search Report (Application No. 18155437.9) dated Jul. 24, 2018.
German Search Report (Application No. 10 2018 117 026.2) dated Mar. 8, 2019.

*Primary Examiner* — D Glenn Dayoan
*Assistant Examiner* — Melissa Ann Bonifazi
(74) *Attorney, Agent, or Firm* — Burr & Brown, PLLC

(57) ABSTRACT

A device for arranging a passenger restraint system in a vehicle, in particular for arranging a child seat, in order, using the passenger restraint system, to secure a person seated in the vehicle, the device in the arranged state being fastened to a belt frame for a vehicle seat or for a vehicle seat bench. The belt frame includes a support arrangement with a vertical support and a cross strut, and, when the support arrangement is in the arranged state on the vehicle, the vertical support being arranged upright on a floor of the vehicle. The device is present as an elongate profile and wherein the device has mounting members along a longitudinal axis of the profile for the fastening of retaining catches of the passenger restraint system. The mounting members are present spaced apart from one another along the longitudinal axis of the profile.

14 Claims, 4 Drawing Sheets

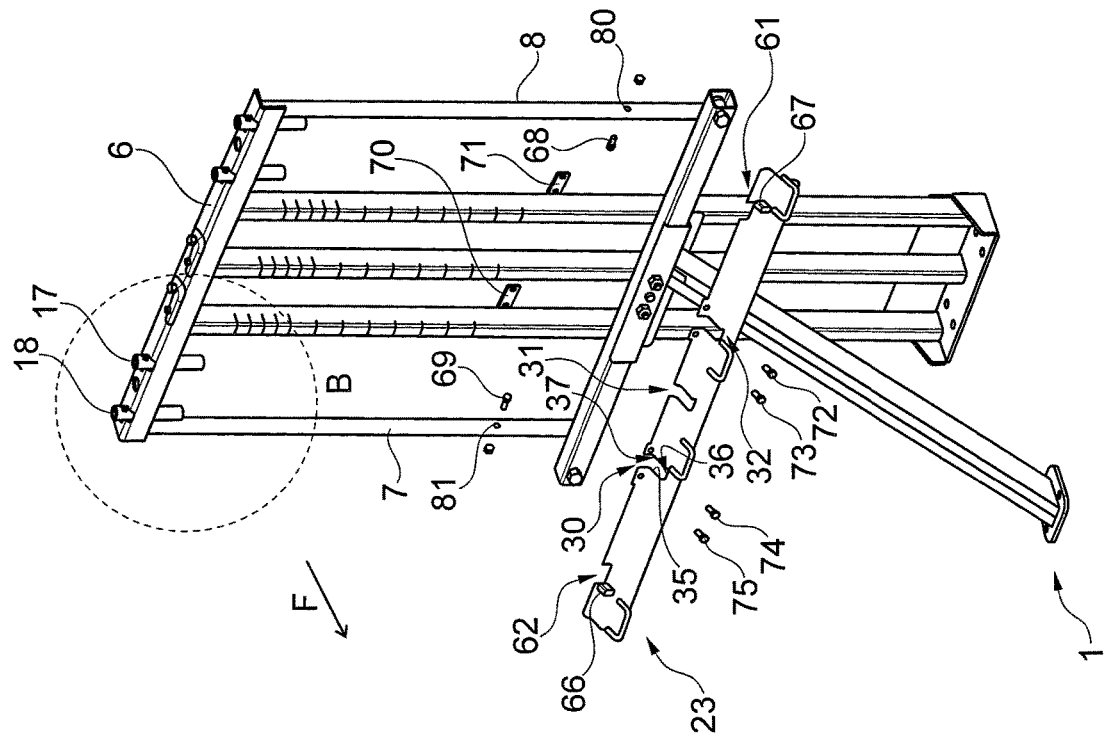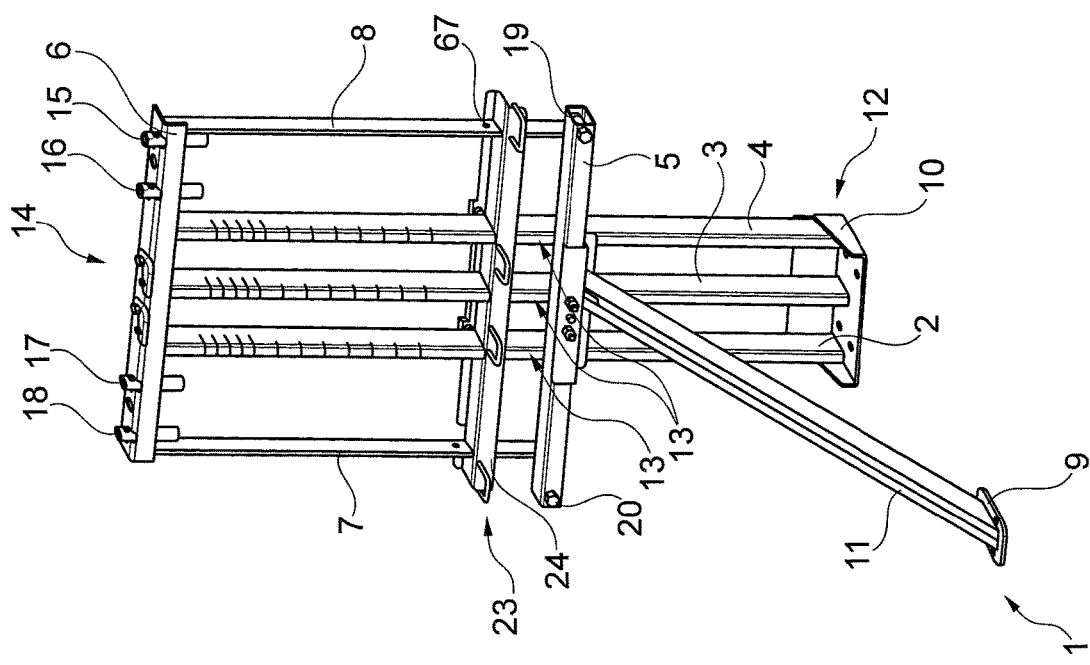

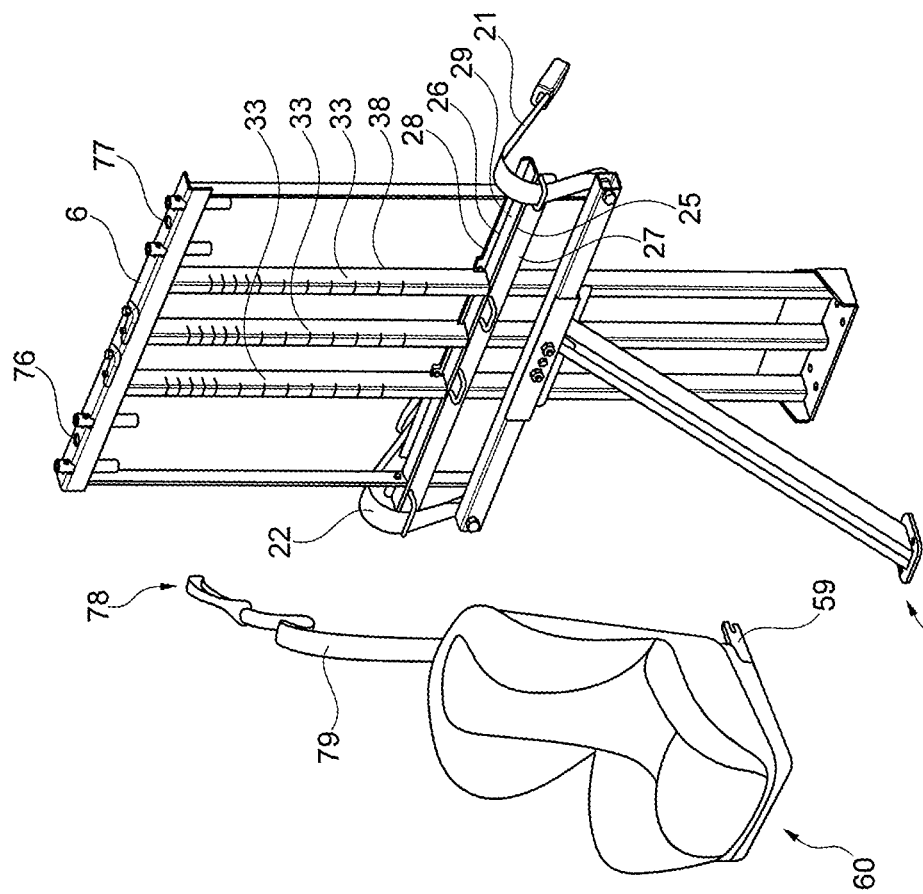
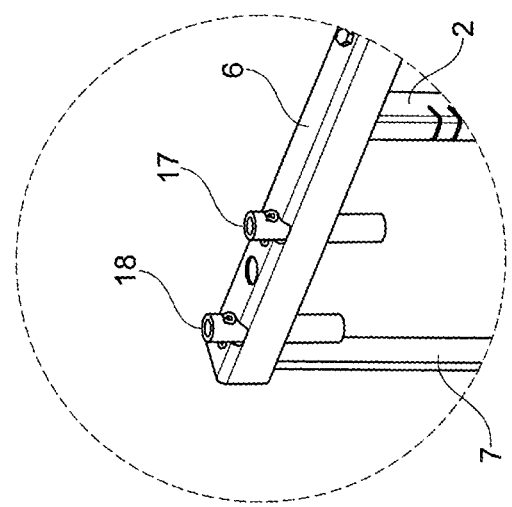
Fig. 3
Detail B
Fig. 4

DEVICE FOR ARRANGING A PASSENGER RESTRAINT SYSTEM IN A VEHICLE

FIELD OF THE INVENTION

The present invention relates to a device for arranging a passenger restraint system in a vehicle.

BACKGROUND OF THE INVENTION

Devices for attaching a passenger restraint system in, a means of transport are known, for example, for attaching a seat belt arrangement for securing passengers, and components of an associated passenger seat, in the means of transport.

In means of transport, such as vehicles, for example, passenger cars, minibuses, motorhomes or camper vans, such devices are provided together with remaining parts of a vehicle seat as a structural unit for retrofitting the vehicle seat in the vehicle interior after the manufacturing of the vehicle. The device, with the passenger restraint system present thereon, has to be designed here for maximum load situations which occur in the vehicle and can occur, in particular, in connection with road-traffic accident scenarios. A retrospective changing of the device or of a function of the device after the device is installed in the vehicle interior is not provided in the known devices.

The design of the device has, in particular, to meet safety or stability criteria which are required, for example, for approval of the device or of the vehicle. Realizing or producing the device in an inexpensive and economically advantageous manner presents a particular challenge.

SUMMARY OF THE INVENTION

It is the object of the present invention to provide a device of the type described in the introduction, or a passenger seat arrangement for a vehicle, in a technically and economically advantageous manner. In particular, the device is intended to be able to be upgraded functionally and comparatively inexpensively.

The present invention is based on a device for arranging a passenger restraint system in a vehicle, in particular, the invention is based on a device for arranging a child seat, in order, using the passenger restraint system, to secure a person seated in the vehicle, the device in the arranged state being fastened to a belt frame for a vehicle seat or for a vehicle seat bench, the belt frame comprising a support arrangement with at least one vertical support and at least one cross strut, and, when the support arrangement is in the arranged state on the vehicle, the vertical strut being arranged upright on a floor of the vehicle.

The belt frame advantageously comprises two, in particular, three, vertical supports, wherein the vertical supports are, for example, spaced apart from one another. The cross strut preferably connects the plurality of vertical supports to one another. The vertical supports are advantageously spaced apart from one another laterally or horizontally. The foot region of the vertical supports can optionally have a connection of the vertical supports to one another, for example, by means of a cross strut, via which fixing to the floor region of the vehicle on the vehicle structure can be established.

A cross strut is preferably designed to be continuous, and preferably projects horizontally or laterally, for example on both sides or on one side, over the one vertical support or the plurality of vertical supports. Accordingly, the cross strut is generally longer than a footprint dimension, or an, in particular, lateral spacing, of two, in particular, outer, vertical struts.

Such a belt frame is designed, for example, as a mounting device in the manner of a support-type frame, comprising clear spaces which are framed by, in particular, elongate profiles which are oriented parallel and at an angle to one another and are connected to one another. The profiles are preferably composed of a metallic material.

For example, the belt frame also comprises attaching means for attaching the belt frame to a structure of a vehicle in the region of a vehicle floor. The belt frame is preferably configured and designed so as to be fastened in the vehicle, or in a motor vehicle, to a floor portion of the vehicle. The attaching means are preferably designed to attach the belt frame releasably or fixably in a nonreleasable manner to the vehicle structure, for example to a vehicle frame. For example, the belt frame is screwed and/or welded to the vehicle structure by the attaching means when they are arranged on the vehicle. The attaching means of the belt frame for attaching to a structure of a vehicle in the region of a vehicle floor are formed, for example, at the foot region of the belt frame.

The vehicle is designed, for example, as an automobile, as a bus, as a motorhome or else as a camper van. The belt frame advantageously forms a basic structure for a seat arrangement in the vehicle, or for a vehicle seat arrangement.

A passenger restraint system is advantageously designed as a seat belt arrangement, for example, as a multi-point belt safety system or as a three-point belt safety system. Such a component is, for example, present in the form of a belt retractor, a belt deflection arrangement for changing the direction of the belt guided past same, a means of fixing a belt end or in the form of a belt buckle at which a plug-in part can be releasably latched into place, by means of which the belt can be drawn out as a loop.

A further passenger restraint system is present, for example, as a child seat and/or as a baby safe, the child seat advantageously comprises retaining catches according to the ISOfix standard. The retaining catches of the child seat are formed, for example, in the rear-side region of the child seat below a seat surface of the child seat. A component of the passenger restraint system can preferably be attached in accordance with the ISOfix standard to the belt frame, in particular, to the device which can be arranged on the belt frame.

The belt frame to which the device can be attached has to be configured structurally or mechanically so as to be able to sufficiently oppose a maximally tolerable or possible load, in particular, in the event of dynamic load conditions, i.e. to be able to absorb and transfer corresponding forces and moments. This is a prerequisite for maintaining the safety of a passenger who is secured by means of a passenger restraint system via the device on the belt frame. The belt frame is accordingly preferably configured to form an inner support structure of a passenger seat fixedly installed in the vehicle.

For a comparatively greater stability of the belt frame, for example, for extending the possibility of use in a passenger seat having two or more seating places, the belt frame can comprise, for example, exactly two or exactly three parallel vertical supports, for example, spaced apart from one another, wherein the vertical supports are preferably identical in structure. The two vertical supports are preferably connected to a horizontally arranged cross strut.

In the case of a typical advantageous belt frame having two or three vertical supports which can be set in an upright position in the vehicle, and having a horizontally oriented cross strut, the length of the vertical supports, or the height of the belt frame in the mounted state, is approximately 1.1 m to approximately 1.3 m, wherein the vertical supports, in particular, the two outer vertical supports, are present spaced apart laterally from one another by a distance of, for example, approximately 0.3 m to 0.4 m. A length of the cross strut is preferably approximately 0.7 m to 0.9 m.

The vertical support and/or the cross strut are/is advantageously designed as a hollow profile. In cross section, the hollow profile is typically rectangular or square, but it is also conceivable for the hollow profile to be round or elliptical in cross section. A typical length and/or width dimension, or lateral dimension, of the cross section of the hollow profile is approximately 20 mm to 40 mm. A wall thickness of the hollow profile is normally in a single-digit millimeter range. It is also conceivable for the hollow profile to be a multiple hollow profile.

Furthermore, it is conceivable for the hollow profile, in particular, the vertical support, to have a material recess, for example, a slot, which is designed as a predetermined bending point for when the arranged belt frame is subjected to load, for example, in the event of the vehicle crashing. A plastic deformation behavior of the vertical support, when subjected to load, can thus be influenced, in particular, predetermined. Advantageously, the recess on the vertical support extends, in particular, in the horizontal direction over a front side of the vertical support and over at least one lateral region of the vertical support that adjoins the front side. In particular, the material recess extends in portions on the front side and on two opposing lateral regions of the vertical support that laterally adjoin the front side. The front side should be understood with regard to an attached state of the belt frame in the vehicle.

A vehicle seat or passenger seat which can be formed with the belt frame accordingly has a seat structure having a seat surface which is located on the front side of the passenger seat, and therefore on the front side of the belt frame or on the front side of the vertical support and/or on a front side of the cross strut, wherein the front side of the vertical support and the front side of the cross strut are advantageously oriented in the direction of travel.

When the belt frame has been installed in the vehicle, the relevant load direction normally corresponds to a seating direction of the secured person, or to the direction of travel of the vehicle. In a vehicle, a maximum load occurs, for example, if the traveling vehicle collides with an obstacle, in a crash. Owing to the decelerated mass of the person seated and secured in the vehicle, a tensile force acting in a jolting manner, or a moment resulting therefrom, acts on the device arranged on the belt frame, and therefore on the belt frame, in the load direction, or in the direction of travel.

An essential aspect of the present invention now consists in that the device is present as an elongate profile, wherein the device has mounting members along a longitudinal axis of the profile for the fastening of retaining catches of the passenger restraint system, in particular of an ISOfix passenger restraint system, wherein the mounting members are present spaced apart from one another along the longitudinal axis of the profile, and wherein the device in the form of an elongate profile is present as an add-on unit separate from the belt frame and can be attached retrospectively to the belt frame. The belt frame and/or the device can thereby be produced comparatively inexpensively. For example, a variant design of the device according to the present invention can be arranged on different belt frame variants. Development costs and production costs are thereby comparatively reduced because of a greater batch size of the devices.

The device can advantageously be arranged in a releasably fixable manner on the belt frame. The device and the belt frame are preferably designed in such a manner that the device can be retrofitted to the belt frame, in particular, in the arranged state of the belt frame on the vehicle seat.

For example, the device, in particular in the arranged state on the belt frame or on the vehicle seat, meets the ISOfix standard ISO 13216.

Moreover, it is of advantage that the profile is present as a folded profile, in particular, folded profile band. The device can thereby firstly be produced comparatively inexpensively and second is comparatively stable.

The profile is advantageously present as an in particular folded steel band, for example, as a folded profile strip and/or folded steel strip. The profile is, for example, L-shaped or U-shaped in cross section, and is thereby comparatively stable in relation to a transverse force which acts on the profile, in particular, perpendicularly to a longitudinal axis of the profile, in particular, in the event of a crash. The profile is advantageously formed integrally. The device can thereby be produced comparatively inexpensively.

Furthermore, it is proposed that the profile is present in such a manner that the profile in the arranged state on the belt frame engages around the vertical support. For example, the profile in the arranged state on the belt frame surrounds the vertical support, in particular, completely, for example, in the manner of a clamp. As a result, the profile can be arranged comparatively simply on the belt frame, in particular, can be fixed comparatively simply on the belt frame.

The profile preferably comprises a receiving member for receiving the vertical support of the belt frame in the arranged state. The receiving member is advantageously designed as a recess. The receiving member surrounds the vertical support in the arranged state on the belt frame, for example, on three sides, for example, by side edges of the recess.

In addition, it has proven advantageous that the device has clamping members, wherein the device in the arranged state on the belt frame is fixed, for example, clamped, to the vertical support of the belt frame by the clamping members. It is furthermore conceivable that the clamping members are formed by the device being able to be fixed to the belt frame without a tool. It is furthermore conceivable that the device and/or the clamping members in the arranged state on the belt frame are present on the belt frame in a releasable, for example, exchangeable, manner.

In the arranged state on the belt frame, the elongate profile, in particular, an outer edge of the recess of the profile, advantageously extends as far as a rear region of the vertical support. For example, the profile extends in such a manner that, in the arranged region on the belt frame, it is flush with a rear edge and/or a rear side of the vertical support. It is also conceivable that, in the arranged state, the profile protrudes over the rear region of the vertical support. The elongate support comprises, for example, mounting openings, for example, bores, for receiving the clamping members. It is furthermore conceivable that, in the arranged state on the belt frame, the profile, in particular, the recess of the profile, and the clamping members are present lying against the vertical support, for example, are present in contact with the vertical support. In the arranged state on the belt frame, the clamping members are present lying against the vertical support, in particular, exclusively on the rear side of the vertical support. A length of the clamping member is advantageously identical to or greater than a width of the vertical support. The rear side of the vertical support extends, for example, along the width and a length of the vertical support.

It is conceivable that the width of the clamping member in the arranged state on the belt frame extends as far as the rear edge of the rear side of the vertical support. The clamping member advantageously extends along its width in the arranged state on the belt frame beyond a rear edge of the rear side of the vertical support, in particular, beyond the width of the vertical support. In the arranged state of the clamping member and of the profile on the belt frame, the clamping member and the profile advantageously extend parallel to each other, in particular, the longitudinal axis of the profile extends parallel to a front side of the clamping member, wherein the clamping member with the front side is present, for example, in a manner lying against a vertical support of the belt frame. For example, in the arranged state on the belt frame, the width of the clamping member and the longitudinal axis of the profile extend in a horizontal direction.

In an advantageous refinement of the device, a distance of a retaining point of the mounting member from an attachment point of the mounting member to the profile is present in an adjustable manner, wherein, in the arranged state, a retaining catch of the passenger restraint system acts on the retaining point of the mounting member. By this means, the belt frame, in particular, the device, can be adapted to a configuration of a vehicle seat. For example, to a cushion thickness of the vehicle seat. The adaptability of the device simplifies the mounting of the passenger restraint system on the mounting member.

Advantageously, two mounting members are provided for fastening a passenger restraint system to the device. One mounting member is advantageously designed as a bracket, for example, as a retaining bracket. It is conceivable for a mounting member to be present in a U-shaped or L-shaped manner. The mounting member is present, for example, in a dimensionally stable manner. The mounting member is provided for latching to a retaining catch of the passenger restraint system, in particular, to a retaining catch of a child seat, for example, for entering into a releasable connection.

For example, a distance of the retaining point from the attachment point of the mounting member to the profile is designed to be adjustable via screwing means. For example, the mounting member is present as a U-shaped retaining bracket, wherein open ends of the U-shaped retaining bracket have an external thread, for example, are present in the manner of a threaded rod. By this means, a distance of the retaining point from the attachment point of the mounting member to the profile can be adjusted comparatively simply via screwing means. For example, in the arranged state on the profile, the mounting member is connected to the profile in a releasable, in particular, adjustable, manner via a screw connection. It is also conceivable for the mounting member to be welded, riveted and/or adhesively bonded to the profile. The mounting members are advantageously present on the profile in a manner protruding from the profile.

Furthermore, it is proposed that the device, in particular, the profile, has a grid dimension. By means of the grid dimension, the profile is present in such a manner that it can be arranged on different belt frames which likewise have the grid dimension. In particular, a single device can be used for different belt frames. By this means, the belt frames can be retrofitted comparatively inexpensively and simply with a passenger restraint system, in particular, with an ISOfix passenger restraint system for the fastening of a child seat and/or a baby safe.

An advantageous modification of the invention provides a belt frame for a vehicle seat or for a vehicle seat bench, the belt frame comprising a support arrangement with at least one vertical support and at least one cross strut, and, in the arranged state of the support arrangement on the vehicle, the vertical strut being arranged upright on a floor of the vehicle, wherein the belt frame is designed to arrange a device according to one of the previously mentioned variants. The belt frame is advantageously designed in such a manner that a device which is arranged on the belt frame is fixed to the belt frame. The belt frame preferably comprises the device.

It has also proven advantageous that the support arrangement of the belt frame has two cross struts, wherein a first cross strut is present at an upper end of the support arrangement, wherein the first cross strut is designed for the arrangement of a head rest of the vehicle seat, wherein a second cross strut is present in a central region of the support arrangement, as viewed in the vertical direction, wherein, in the arranged state of the belt frame on the vehicle seat, components of a passenger restraint system are arranged on the second cross strut, wherein the first and the second cross strut extend on the support arrangement in the horizontal direction, wherein, at an outer region of the first and of the second cross struts, the first and the second cross strut, as viewed in a vertical extent, are connected to each other by a band-like element, wherein the band-like element has attachment members, as a result of which one of the above-mentioned variants of the device is fixed in the arranged state on the belt frame. By this means, the profile and the belt frame are present in a comparatively stable manner, with energy absorption and transfer, in particular in the event of a crash, of forces acting on the profile and/or the belt frame being improved.

The band-like element is present, for example, as flat steel or as a sheet metal strip. It is also conceivable for the band-like element to be designed as a band, in particular, as a belt band. The band-like element is advantageously connected nonreleasably to the cross struts. The band-like element is, for example, screwed, riveted, welded, soldered and/or adhesively bonded to the cross struts. Preferably, two band-like elements are provided on the support arrangement, wherein the two band-like elements are fastened spaced apart from each other at opposite ends of the cross struts.

An attachment member is advantageously designed as an opening, hole and/or bore, for example, passage bore, on the band-like element, wherein the device can be fastened, in particular, releasably, to the opening of the band-like element by fastening means, for example, in the form of a screw and/or a rivet. For example, in the arranged state on the belt frame, the device is present at spaced-apart ends of the profile so as to be connectable in each case at one end of the profile to a band-like element of the belt frame.

For example, two in particular mutually different passenger restraint systems are present on the belt frame, in particular, on the vehicle seat. For example, a three-point belt safety system and/or a multi-point belt safety system and a passenger restraint system for a child seat, for example, corresponding to the ISOfix standard.

Furthermore, it is of advantage that the device, as viewed in a vertical extent of the support arrangement, is arranged, in particular, is present, on the belt frame in a region between the first and the second cross struts. In the arranged state of the belt frame on the vehicle seat and/or on the vehicle, components of a passenger safety system, in particular, of a three-point belt safety system, are fastened to the first and to the second cross strut. For example, a belt buckle can be fastened to the second cross strut and, for example, a belt retractor can be fastened to the first cross strut.

In addition, it is proposed that mounting members for the fastening of a top-tether band of a passenger restraint system, in particular, a child seat, are present on the first cross strut. The mounting members are advantageously present on the first cross strut in a region between mounting points of a headrest of the vehicle seat. One mounting member is present, for example, as a recess and/or opening, for example, as a bore on the first cross strut. By this means, the top-tether band can be fastened, for example fitted, comparatively simply to the first cross strut.

It has also proven advantageous that the belt frame has a grid dimension. The grid dimension of the belt frame is designed, in particular, in such a manner that a horizontal distance of the vertical strut or optionally of the vertical struts and the band-like elements predetermine the grid dimension. In an advantageous manner, in the case of mutually different belt frames, the horizontal distance of the vertical strut or of the vertical struts and/or the band-like elements is identical. By this means, a single device can be arranged on a plurality of mutually different belt frames.

DESCRIPTION OF AN EXEMPLARY EMBODIMENT

An exemplary embodiment will be explained in more detail with reference to the schematic drawings below and with further details and advantages being specified.

FIG. 1 shows a perspective view obliquely laterally at the top front of a belt frame with a device according to the present invention in the arranged state on the belt frame;

FIG. 2 shows a perspective view obliquely laterally at the top front of the belt frame from FIG. 1 with the device in an exploded illustration;

FIG. 3 shows a perspective view obliquely laterally at the top front of the belt frame from FIG. 1 with arranged belt buckle anchors and a passenger restraint system in a state released from the belt frame;

FIG. 4 shows a detailed view of the belt frame from FIG. 1;

Figure 6:
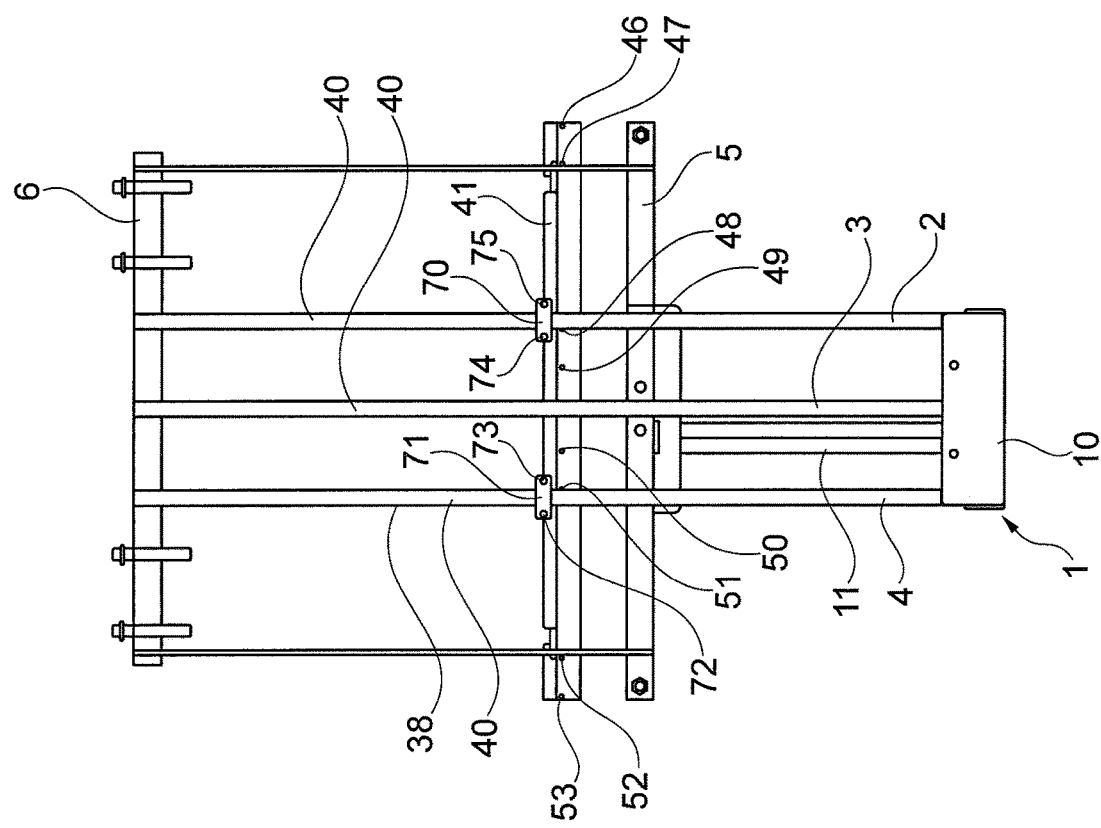
Figure 5:
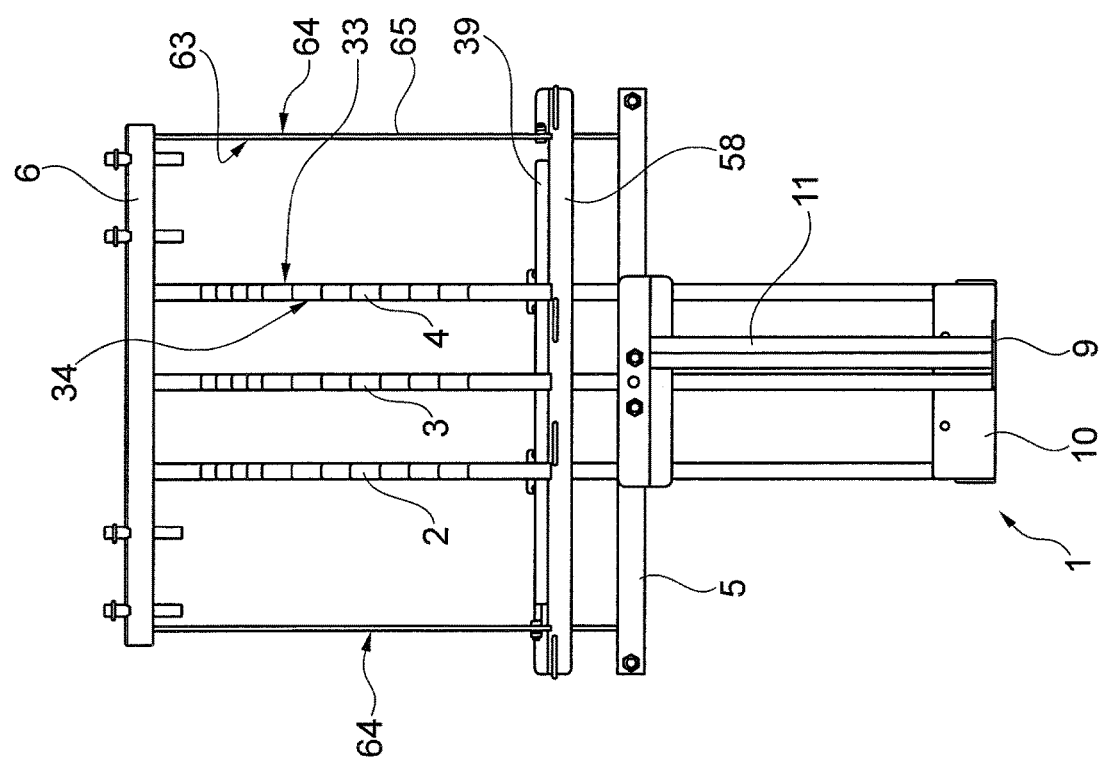
Figure 8:
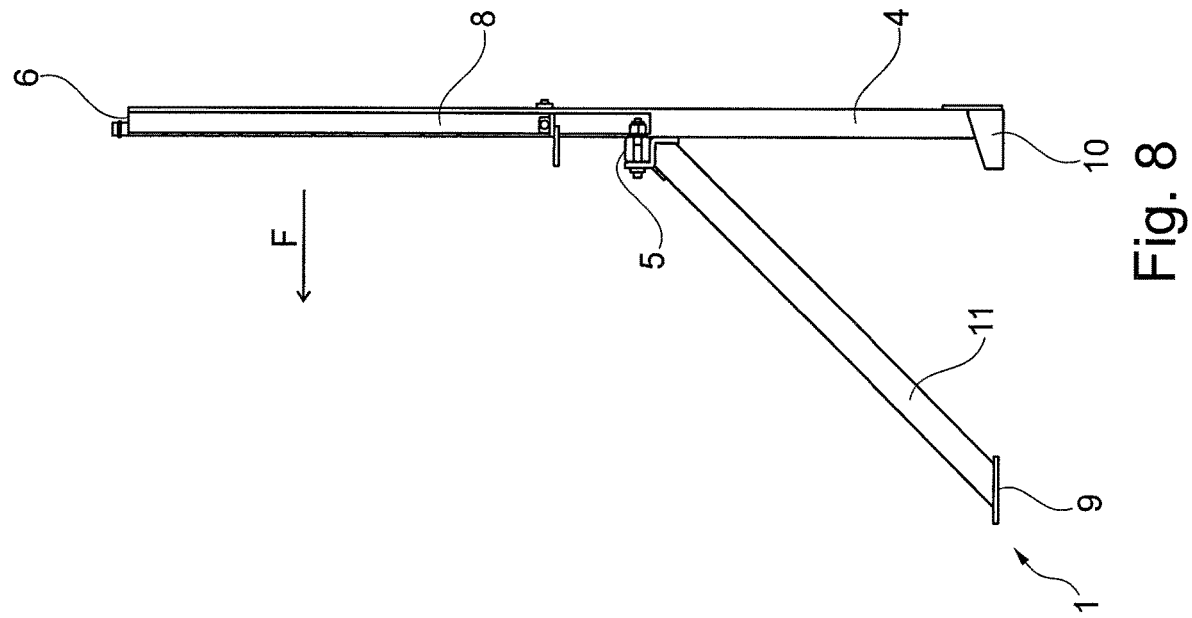
Figure 7:
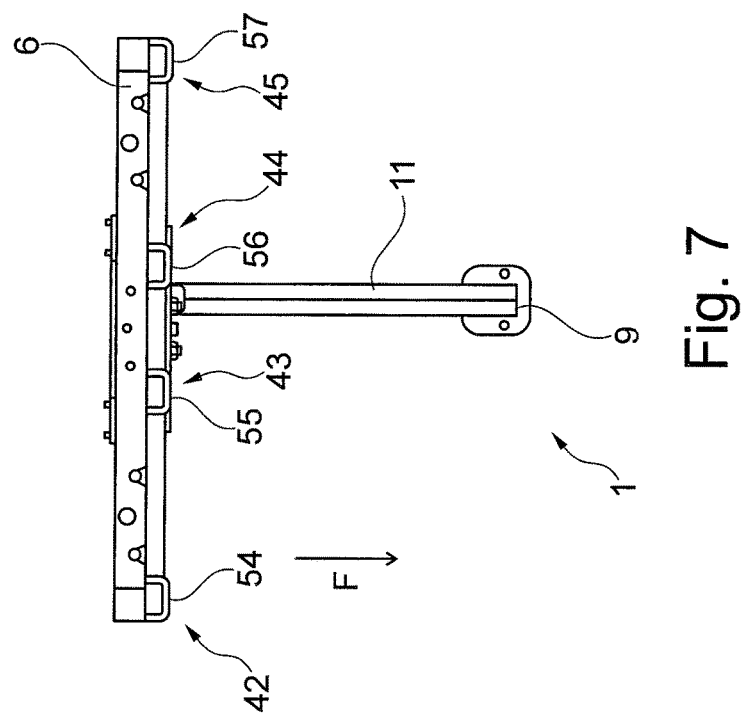

FIG. 5 shows a front view of the belt frame from FIG. 1;
FIG. 6 shows a rear view of the belt frame from FIG. 1;
FIG. 7 shows a top view of the belt frame from FIG. 1; and
FIG. 8 shows a side view of the belt frame from FIG. 1.

DETAILED DESCRIPTION OF THE INVENTION

A basic frame 1 comprises, for example, inter alia three vertical supports 2-4, a first cross strut 5 and a second cross strut 6, two connecting elements 7, 8, an attaching means 9, 10 and a support foot 11 (FIGS. 1 to 3 and 5 to 8). The belt frame 1 is designed, for example, for a two-seat vehicle seat (not shown).

In the arranged state on the basic frame 1, longitudinal axes of the three vertical supports 2-4 are present in a manner oriented vertically on the basic frame 1. The vertical supports 2-4 are present spaced apart from one another and, for example, next to and parallel to one another. Attaching means 10 are provided in the foot region 12 of the vertical supports 2-4 in order to fasten the vertical supports 2-4 in the arranged state to a vehicle (not illustrated), for example, to screw same to a vehicle floor. The cross struts 5, 6 are advantageously perpendicular to the vertical supports 2-4 and are preferably connected, in particular, nonreleasably, to each of the vertical supports 2-4. For example, the cross struts 5, 6 are welded to the vertical supports 2-4. It is also conceivable that the cross struts 5, 6 are screwed and/or riveted to the vertical supports 2-4. In an advantageous manner, the first cross strut 5 is mounted with a rear side on a front side 13 of the vertical supports 2-4. In the arranged state of the belt frame 1 on the vehicle, a surface normal of the front side 13 of the vertical supports 2-4 advantageously points in a direction of travel F of the vehicle, in particular, in the direction of the front of the vehicle.

The second cross strut 6 is arranged on one of the vertical supports 2-4 or on each of the vertical supports 2-4, for example, at a head region 14 of the belt frame 1. Sleeve-like attaching elements 15-18 are formed on the second cross strut 6 and are provided, for example, in each case in pairs, for arranging a headrest (not illustrated).

The first cross strut 5 is advantageously fastened to the vertical supports 2-4 approximately level with a seat surface of a vehicle seat, wherein the vehicle seat comprises the basic frame 1. In particular, the first cross strut 5 is formed starting from the attaching means 10 upward in the vertical direction level with a first and/or lowermost third of a length of the vertical supports 2-4.

The connecting elements 7, 8 are in the form of, for example, a band, for example, a steel band. The connecting elements 7, 8 connect the first cross strut 5 and the second cross strut 6 to each other. The connecting elements 7, 8 are advantageously connected, for example, welded, nonreleasably to the cross struts 5, 6. The connecting elements 7, 8 are oriented, for example, parallel to the vertical supports 2-4 and extend, for example, in the vertical direction.

The connecting elements 7, 8 are advantageously provided to keep the cross struts 5, 6 at a defined, for example, vertical distance from each other, in particular, in the event of a crash. For example, the connecting elements 7, 8 are provided to secure a maximum vertical distance of the cross struts 5, 6 from each other, in particular, in such a manner that the cross struts 5, 6 do not exceed the maximum vertical distance from each other in the event of a crash. The connecting elements 7, 8 preferably connect ends of the cross struts 5, 6 to each other.

Furthermore, fastening screws 19, 20 are formed at the ends of the first cross strut 5. In the arranged state of the belt frame 1 on the vehicle seat, a safety component of a passenger restraint system, for example, a belt buckle anchor 21, 22 with a belt buckle (FIG. 3) of a three-point belt safety system, is fastened by means of the fastening screws 19, 20.

A device 23 according to the present invention is designed as an elongate, in particular, folded profile 24. The profile 24 has, for example, two folds 25, 26 in the form of bent-over portions, and therefore the profile is zigzag-like in cross section. The folds 25, 26 advantageously extend along a longitudinal axis of the profile 24. The profile 24 has, for example, a first and a second flat profile portion 27, 28, wherein the two profile portions 27, 28 are advantageously parallel to each other. In the arranged state on the belt frame 1, the first and the second profile portion 27, 28 advantageously each extend in a vertical direction, for example, parallel to the longitudinal axis of a vertical support 2-4 and along the longitudinal axis of the profile 24. In addition, the profile 24 has a third flat profile portion 29 which is advantageously oriented at an angle to the first and to the second profile portion 27, 28. In the arranged state on the belt frame 1, the profile portion 29 is advantageously oriented horizontally. The profile 24 is, for example, integral, with the three profile portions 27-29 merging into one another via the folds 25, 26 (FIGS. 2, 3).

The profile 24 furthermore comprises spaced-apart receiving members in the form of recesses 30-32. The recesses 30-32 are, for example, cut, for example lasered, out of the profile 24. The recesses 30-32 are, in particular, present on the second and third profile portions 28, 29, by the profile 24 being able to be placed or pushed onto the vertical supports 2-4 in the horizontal direction. The recesses 30-32 are coordinated, in particular, with an outer contour of the vertical supports 2-4 of the belt frame 1 in that, in the arranged state of the device 23 on the belt frame 1, the recesses 30-32 surround the vertical supports 2-4, at least on the front side 13 and on side surfaces 33, 34, in particular, completely, for example, lying directly thereagainst. In the arranged state on the belt frame 1, the recesses 30-32 advantageously lie with edge surfaces 35-37, in particular, in a flush and/or form-fitting manner, against the front side 13 and the side surfaces 33, 34 of the vertical supports 2-4.

It is conceivable for a width of the third profile portion 29 to be greater than a depth of the vertical supports 2-4. In the arranged state of the profile 24 on the belt frame 1, the third profile portion 29 advantageously extends opposite the direction of travel F over a rear edge 38 of the vertical support 2-4. For example, in the arranged state of the device 23 on the belt frame 1, a front side 39 of the second profile portion 28 is flush with a rear side 40 of the vertical supports 2-4. It is also conceivable that, in the arranged state of the profile 24 on the belt frame 1, a rear side 41 of the second profile portion 28 is flush with the rear side 40 of the vertical supports 2-4, wherein the rear side 41 is formed opposite and spaced apart from the front side 39 of the second profile portion 28.

A distance of the recesses 30-32 along the longitudinal axis of the profile 24 advantageously corresponds to a horizontal distance of the vertical supports 2-4 of the belt frame 1, and therefore the device 23 can be attached to the belt frame 1 comparatively simply and in an exactly fitting manner. The distances between the recesses 30-32 and the vertical supports 2-4 correspond, for example, to a grid dimension.

In addition, the device 23 comprises mounting members in the form of retaining brackets 42-45 which are of U-shape design and are arranged in a protruding manner on the first profile portion 27. The retaining brackets 42-45 are screwed and/or welded to the profile 24, for example at attachment points 46-53. A distance of a retaining point 54-57 of the retaining brackets 42-45 from a front side 58 of the second profile portion 27 can be adjusted, for example, before the device 23 is mounted on the belt frame 1, wherein a retaining catch 59 of a child seat 60, in the arranged state of the child seat 60, acts on the belt frame 1 at the retaining point 54-57. In the arranged state of the device 23 on the belt frame 1, a change in the distance of the retaining point 54-57 from the front side 58 is advantageously prevented, for example, because the retaining brackets 42-45 are welded to the profile 24 after the distance has been adjusted.

Furthermore, the profile 24 comprises slot-like notches 61, 62 in which the connecting elements 7, 8 engage in the arranged state of the device 23 on the belt frame 1. The slot-like notch 61, 62 extends on the profile 24, preferably on the second and third profile portion 28, 29. The notch 61, 62 advantageously surrounds a connecting element 7, 8, for example, in a form-fitting manner at least on side surfaces 63, 64 and on a front side 65 of the connecting element 7, 8. In the region of the slot-like notch 61, 62, a tab-like attachment element 66, 67 has been cut out of the second profile portion 28 and bent out forward in the direction of the second profile portion 27, in particular, bent out in the direction of travel F in the arranged state of the profile 24 on the belt frame 1. In the arranged state on the belt frame 1, the attachment elements 66, 67 advantageously lie against the outer side surface 64 of the connecting elements 7, 8 and are connected to the latter, for example, are screwed with screws 68, 69, at mounting points 80, 81.

It can be gathered, in particular, from FIGS. 2 and 6 that the device 23 comprises clamping members in the form of connecting plates 70, 71. In the arranged state of the profile 24 on the belt frame 1, the connecting plates 70, 71 are arranged lying against the rear side 40 of the vertical supports 2-4 and are screwed to the profile 24 via screws 72-75. By this means, a front edge surface 36 of the recesses 30-32 are pulled against the front side 13 of the vertical supports 2-4 and therefore the device 23 is clamped to the belt frame 1. In the exemplary embodiment shown, the device 23 is arranged on the belt frame 1 by means of two connecting plates 70, 71. However, it is also conceivable that the device is connected in a clamping manner to the belt frame via a single connecting plate on a single vertical support 2-4. It is furthermore conceivable that the device is connected in a clamping manner to the belt frame on all the vertical supports of a belt frame.

An enlarged detail of the belt frame 1 according to FIG. 2 can be seen in FIG. 4. FIG. 4 shows a partial region of the head-side cross strut 6 on which a bore 76 is formed. One end 78 of a top-tether band 79 of the child seat 60 can be fitted onto the bore 76. The belt frame 1 is provided for a two-seat vehicle seat (not shown), and, for this reason, a further bore 77 for the attaching of a further child seat is formed on the head-side cross strut.

LIST OF REFERENCE SIGNS

1 Basic frame
2-4 Vertical support
5, 6 Cross strut
7, 8 Connecting element
9, 10 Attaching means
11 Support foot
12 Foot region
13 Front side
14 Head region
15-18 Attaching element
19, 20 Fastening screw
21, 22 Belt buckle anchor
23 Device
24 Profile
25, 26 Fold
27-29 Profile portion
30-32 Recess
33, 34 Side surface
35-37 Edge surface
38 Edge
39 Front side
40 Rear side
41 Rear side
42-45 Retaining bracket
46-53 Attachment point
54-57 Retaining point
58 Front side
59 Retaining catch
60 Child seat
61, 62 Notch
63, 64 Side surface 65 Front side
66, 67 Attachment element
68, 69 Screw
70, 71 Connecting plate
72-75 Screw
76, 77 Bore
78 End
79 Top-tether band
80, 81 Mounting point

The invention claimed is:

1. A device for arranging a passenger restraint system in a vehicle, which uses the passenger restraint system, to secure a person seated in the vehicle, the device in the arranged state being fastened to a belt frame for a vehicle seat, the belt frame comprising a support arrangement with at least one vertical support and at least one cross strut, and, when the support arrangement is in the arranged state on the vehicle, the vertical support is arranged upright on a floor of the vehicle, wherein the device is configured as an elongate profile, wherein the device comprises mounting members along a longitudinal axis of the elongate profile for fastening of retaining catches of the passenger restraint system, wherein the mounting members are spaced apart from one another along the longitudinal axis of the elongate profile, wherein the device in the form of the elongate profile is an add-on unit separate from the cross strut of the belt frame and can be attached retrospectively to the vertical support of the belt frame, and wherein when the elongate profile is in the arranged state on the belt frame, the elongate profile is engaged around the vertical support.

2. The device for arranging a passenger restraint system in a vehicle as claimed in claim 1, wherein the elongate profile is configured as a folded profile.

3. The device for arranging a passenger restraint system in a vehicle as claimed in claim 1, wherein the device further comprises clamping members, wherein the elongate profile in the arranged state on the belt frame is fixed to the vertical support of the belt frame by the clamping members.

4. The device for arranging a passenger restraint system in a vehicle as claimed in claim 1, wherein a distance of a retaining point of the mounting members from an attachment point of the mounting members to the elongate profile is configured in an adjustable manner, wherein, in the arranged state, the retaining catch of the passenger restraint system acts on the retaining point of the mounting members.

5. The device for arranging a passenger restraint system in a vehicle as claimed in claim 1, wherein the elongate profile comprises a grid dimension.

6. The device for arranging a passenger restraint system in a vehicle as claimed in claim 1, wherein the support arrangement has two cross struts, wherein a first cross strut is present at an upper end of the support arrangement, wherein the first cross strut is designed for the arrangement of a headrest of the vehicle seat, wherein a second cross strut is present in a central region of the support arrangement, as viewed in the vertical direction, wherein, in the arranged state of the belt frame on the vehicle seat, components of a passenger restraint system are arranged on the second cross strut, wherein the first and the second cross strut extend on the support arrangement in the horizontal direction, wherein, at an outer region of the first and of the second cross struts, the first and the second cross strut, as viewed in a vertical extent, are connected to each other by a band-like element, wherein the band-like element has an attachment member, which the elongate profile is fixed in the arranged state.

7. The device for arranging a passenger restraint system in a vehicle as claimed in claim 6, wherein the elongate profile, as viewed in a vertical extent of the support arrangement, is arranged on the belt frame in a region between the first and the second cross struts.

8. The device for arranging a passenger restraint system in a vehicle as claimed in claim 6, wherein the first cross strut further comprises bores for fastening of a top-tether band of a passenger restraint system.

9. The device for arranging a passenger restraint system in a vehicle as claimed in claim 6, wherein the belt frame comprises a grid dimension.

10. A vehicle seat and/or vehicle seat bench with the device as claimed in claim 1.

11. A vehicle with a vehicle seat, a vehicle seat bench and/or a belt frame with the device as claimed in claim 1.

12. The device for arranging a passenger restraint system in a vehicle as claimed in claim 1, wherein the device is for arranging a child seat.

13. The device for arranging a passenger restraint system in a vehicle as claimed in claim 2, wherein the elongate profile is configured as a folded profile band.

14. The device for arranging a passenger restraint system in a vehicle as claimed in claim 5, wherein the belt frame comprises a grid dimension.

* * * * *